United States Patent
Nakagawa et al.

[11] Patent Number: 5,887,211
[45] Date of Patent: *Mar. 23, 1999

[54] CAMERA WITH A SPOOL CHAMBER

[75] Inventors: Yoshio Nakagawa; Junichi Tanii, both of Osaka, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 629,772

[22] Filed: Apr. 9, 1996

[30] Foreign Application Priority Data

Apr. 12, 1995 [JP] Japan .................................. 7-086789

[51] Int. Cl.$^6$ .................................................. G03B 17/02
[52] U.S. Cl. ........................................... 396/538; 396/535
[58] Field of Search .................................... 354/288, 485; 396/442, 440, 542, 538, 535, 540, 539

[56] References Cited

U.S. PATENT DOCUMENTS

| | | | |
|---|---|---|---|
| 4,297,018 | 10/1981 | Murakami et al. | 354/485 |
| 5,150,140 | 9/1992 | Kitazawa | 354/145.1 |
| 5,502,526 | 3/1996 | Katano | 354/288 |

FOREIGN PATENT DOCUMENTS

| | | |
|---|---|---|
| 0380118 | 8/1990 | European Pat. Off. . |
| 1104822 | 4/1961 | Germany . |
| 63-187130 U | 11/1988 | Japan . |
| 2-166434 | 6/1990 | Japan . |
| 4-285946 | 10/1992 | Japan . |
| 7-020552 | 1/1995 | Japan . |

OTHER PUBLICATIONS

Norman Goldburg, Camera Technology the Dark Side of the Lens, Academic Press, 176 and 177, 1992.

Primary Examiner—Safet Metjahic
Assistant Examiner—Michael Dalakis
Attorney, Agent, or Firm—Sidley & Austin

[57] ABSTRACT

An arrangement, for installing an electric component of a printed board, contributing to a reduction in size of a camera. Between a cover of a camera body, and a film pressure plate, is installed the printed board which is larger than the film pressure plate and which extends beyond an outer wall of a spool chamber in a direction in which a film is fed. On the printed board, some electric components such as a step-up transformer and a transistor are mounted. The outer wall of the spool chamber has a concave part in which a part of the electric components is positioned. The dimension of the part of the electric component is absorbed in the thickness of the outer wall of the spool chamber.

8 Claims, 2 Drawing Sheets

CAMERA WITH A SPOOL CHAMBER

BACKGROUND OF THE INVENTION

1. Field of the Invention

The present invention generally relates to a camera with a spool chamber, and particularly relates to a structure for mounting an electronic component, such as a transistor and a step-up transformer, of a printed board in the camera.

2. Description of the Prior Art

Conventionally, there has been provided a type of a camera with a spool chamber and a printed circuit board for controlling its operation electronically.

Meanwhile, to attempt to manufacture a thin, compact-sized camera is a never-ending, technical object in a field of developing a camera. In order to realize such a thin, compact-sized camera, there has been contrived various types of structures and arrangements of the printed boards, and various types of modifications for mounting such electronic components on printed circuit boards. For example, Japanese Laid-Open Utility Model Publication No. 63-187130 discloses a camera with a structure in which a printed circuit board is provided in a space inside most of an exterior cover on a rear side of the camera, including a gap between a film pressure plate and an inner surface of the exterior cover.

Also, Japanese Laid-Open Patent Publication No. 4-285946 discloses a camera with a structure in which a film pressure plate has a concave part in which electronic components of a printed circuit board are accommodated so that the printed circuit board and the film pressure plate contact each other.

According to the structure of the camera disclosed in Japanese Laid-Open Utility Model Publication No. 63-187130, it is possible to make larger the space to accommodate the electronic parts. However, the enlargement of the space to accommodate them also brings an enlargement of the exterior cover of the camera. Thus, the structure described therein does not realize a thin, compact-sized camera.

On the other hand, according to the structure of the camera disclosed in Japanese Laid-Open Patent Publication No. 4-285946, all the electronic components of the printed circuit board are housed in the concave part of a plain, flat member, which is the film pressure plate. With the structure, the concave part of the member cannot help but be relatively large, which may induce a relatively large reduction in strength of the member. With the structure, it is not possible to realize a thin, compact-sized camera, if it is desired that more electronic components be mounted thereon.

SUMMARY OF THE INVENTION

One object of the present invention is, therefore, to provide a camera with a spool chamber, and a structure, for realizing an expansion of a space in which electric components of a printed circuit board are housed, which contributes to a thin, compact-sized camera.

Another object of the present invention is to provide a camera with a spool chamber, and a structure for preventing a film surface from contacting the electric components of the printed circuit board in order to protect the film surface, in case that the electric components occupy a space outside a spool chamber.

In accomplishing these and other objects of the present invention, there is provided a camera comprising: a spool chamber in which a spool for winding a film is provided, wherein the spool chamber is defined by an inner surface of an outer wall; and a concave part formed on an outer surface of the outer wall, in which at least a part of a component of the camera is positioned.

In the structure, the component can be an electric component, such as a capacitor, a step-up transformer, etc.

According to the structure, because a part of a dimension contributing to the formation of the outer wall of the spool chamber is used as a space for accommodating the component therein, it is realized that the overall dimension including both the component and the spool chamber is reduced in a form that the part of the component is incorporated or absorbed in the outer wall of the spool chamber, thus realizing a thin, compact-sized camera.

In the structure, the concave part of the outer wall can be an opening penetrating the outer wall.

According to the structure, the full thickness of the outer wall of the spool chamber is used as a space for accommodating the component; therefore, the overall dimension including both the component and the spool chamber is reduced to a maximum degree.

In the structure, the opening can be covered with a film-like member from inside of the spool chamber.

With the structure, the part of the component is surely prevented from directly entering the inside of the spool chamber, thus preventing a formation of a scar or a scratch on the film surface by a direct contact with the component.

In the structure, the outer wall may comprise a film-like member.

According to the structure, because the thickness of the outer wall corresponding to the film-like member is small, even more space for the component is secured; thus realizing a thinner, compact-sized camera.

Furthermore, according to the structure, the film-like member also functions as a guide for guiding a leader of the film along an inner surface thereof at time of winding the leader around the spool in the spool chamber.

In the structure, it is preferable that the film-like member is formed by a light-shielding member.

With the structure, a light possibly existing outside the spool chamber is surely prevented from entering the inside of the spool chamber, thus preventing the film therein from being exposed to light.

In case that the component is an electric component, and in case that the electric component is mounted on a printed board, the camera can comprise the printed board which is provided between the rear cover, and the pressure plate by which a film is biased against a member having an exposure window, wherein the printed board extends in a field larger than a field in which the pressure plate extends; and the spool chamber which is defined by the outer wall with concave part outside in which at least a part of the electric component is positioned.

That is, if at least one electric component is mounted on the printed board which is positioned between the rear cover and the pressure plate, then, it is necessary to set aside a corresponding space for accommodating the electric component. This means that such a space set aside impedes an attempt to reduce the camera in size and width. However, according to the above structure of the present invention, the space between the rear cover and the pressure plate is not used as the space for the component; instead, a space outside the outer wall of the spool chamber is used as the space for the component. Consequently, the use of the space outside it enables the components to be mounted on the printed board without expanding the space between the rear cover and pressure plate; thus, realizing a thin, compact-sized camera.

Also, according to the above structure of the present invention, different from the conventional structure in which the space outside the outer wall of the spool chamber is not used, the space thereof is used for housing the component. Accordingly, the use of the space leads to an expansion of space for housing the component; thus, realizing a thin, compact-sized camera.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
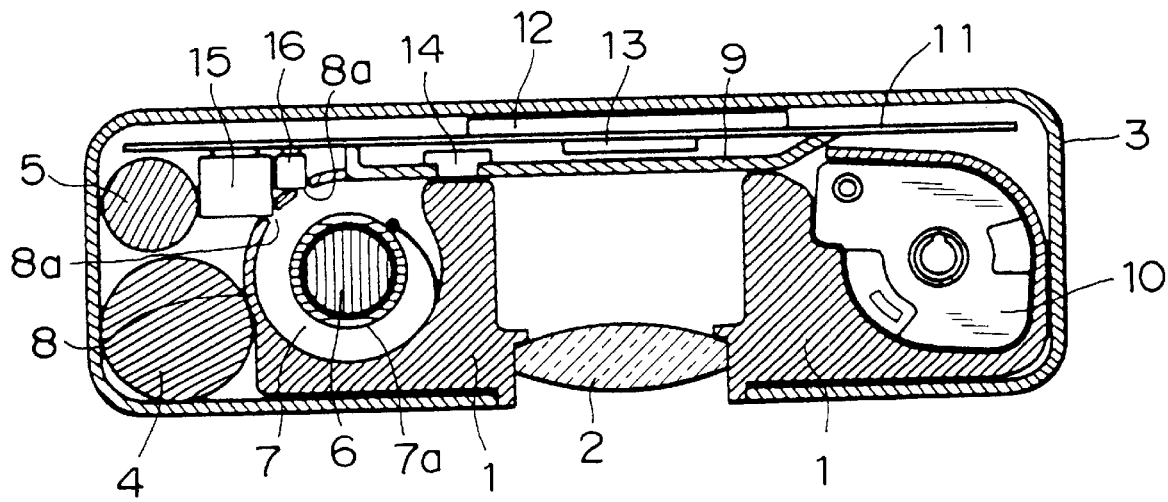
FIG. 1 is a transverse cross-sectional view of a camera according to a first embodiment of the present invention.

Before the description of the present invention proceeds, it is to be noted that like or corresponding parts are designated by like reference numerals throughout the accompanying drawings.

Referring to FIGS. 1 through 4, a full description is made a camera according to a first through fourth embodiments of the present invention.

First, referring to FIG. 1, a description is made the camera according to the first embodiment of the present invention.

In FIG. 1, a reference numeral 1 points to a camera body; 2 to a photographing lens; 3 to a cover; 4 to a battery; 6 to a film-feeding motor; 7 to a spool chamber in which a spool 7a is rotatably mounted; 8 to an outer wall forming the spool chamber 7; 9 to a film pressure plate; 10 to a film cartridge; and 11 to a printed board. As shown in the figure, the printed board 11 is positioned between the cover 3 on a rear side of the camera body 1, and the film pressure plate 9 so as to extend beyond the outer wall 8 of the spool chamber 7 in a direction in which a film is fed between the film cartridge 10 and the spool 7 a.

Also, a reference numeral 5 points to a capacitor for accumulating an electric charge used for a flash (not shown in the figure); 15 to a step-up transformer; 16 to a transistor for controlling an amount of light emitted from the flash; 12 to a LCD for displaying information; 13 to a main IC; and 14 to a magnetic head for recording magnetic information with respect to a magnetic field provided on the film which is fed between the spool 7a and the film cartridge 10.

The step-up transformer 15 and the transistor 16, are mounted on the printed board 11.

In order to set the film cartridge 10 in the camera, the film cartridge 10 is inserted into a cartridge chamber of the camera, in a direction parallel to an axis of its spool. An initial loading of the camera is so performed that the film is pushed out of the film cartridge 10 towards the spool chamber 7 along an inner surface of the film pressure plate 9 and then an inner surface of the outer wall 8 of the spool chamber 7 till a leader of the film is wound around the spool 7a in the spool chamber 7. When the film is thus wound around the spool 7a, the operation to take a photograph can be performed at any time as desired.

As shown in the figure, the spool chamber 7 is defined by the outer wall 8 which is formed with a predetermined curvature. The outer wall 8 of the spool chamber 7 has a concave in a form of an opening 8a penetrating itself, in which a part of the corner of an electronic component such as a step-up transformer 15 and a transistor 16 is positioned.

According to the structure of the embodiment, the dimension, corresponding to the thickness of the outer wall 8 of the spool chamber 7 is used as a space for the part of the corner of the electronic components 15 and 16; thus realizing a thin, compact-sized camera without spoiling a substantial strength of the outer wall 8 of the spool chamber 7.

In the structure, the opening 8a, is formed with such a dimension that the part of the corner of the electronic component 15, 16 does not project inside the spool chamber 7. Therefore, when the film is fed, or is being fed, between the spool chamber 7 and the film cartridge 10, a contact of the film surface relative to the electronic components 15 and 16 is surely avoided, thus preventing damage of the film surface, as in a form of a scar and scratch thereon.

Figure 2:
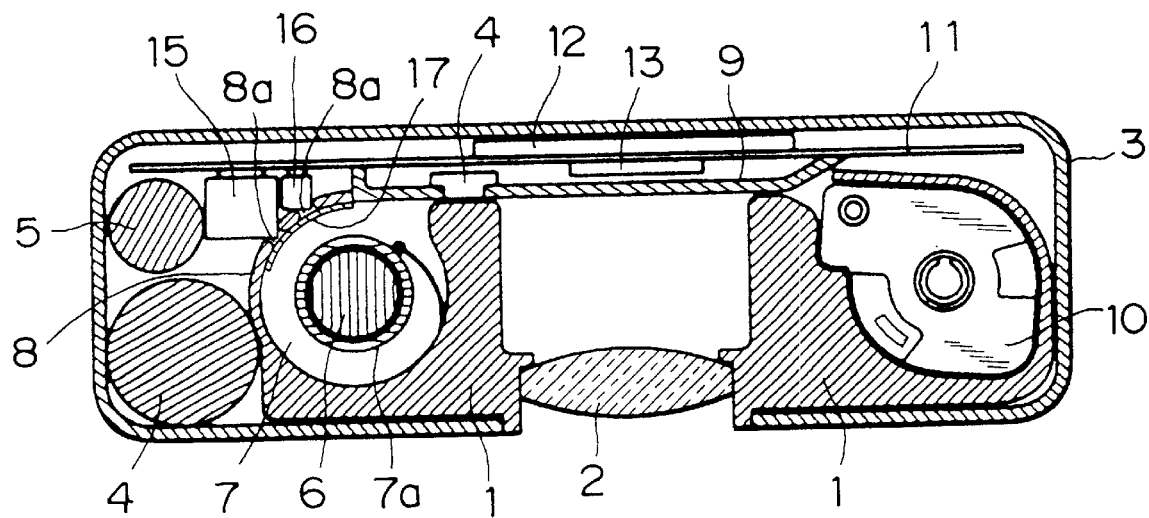
FIG. 2 is a transverse cross-sectional view of a camera according to a second embodiment of the present invention.
Figure 3:
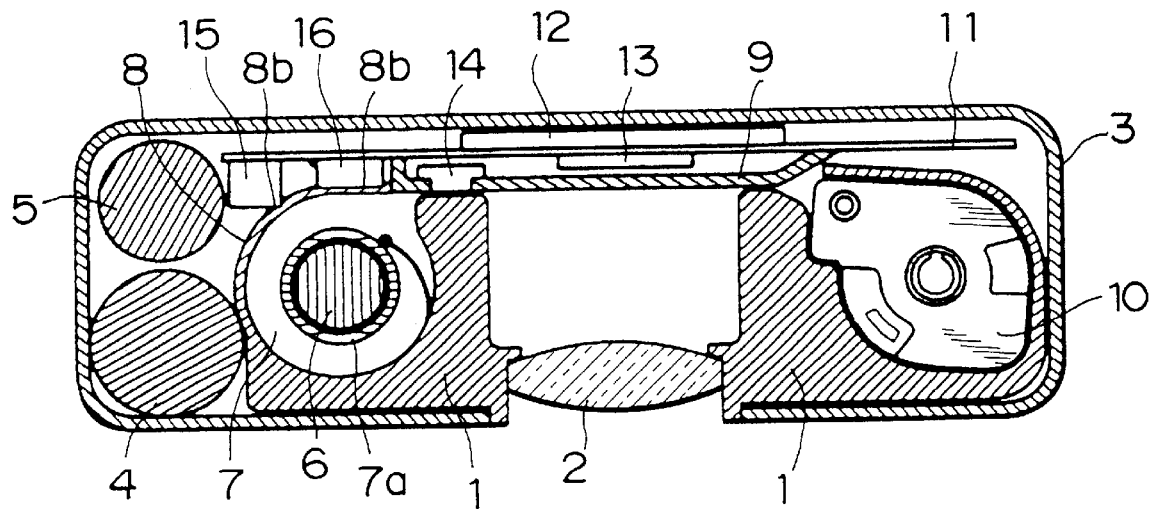
FIG. 3 is a transverse cross-sectional view of a camera according to a third embodiment of the present invention.

In case that there is a possibility that the part of the corner of the electronic component 15, 16 may project inside the spool chamber 7, a thin film-like member or a sheet 17 for protecting the film surface can be adhered on the inner surface of the outer wall 8 of the spool chamber 7, as shown in FIG. 2 as the second embodiment of the present invention, or the outer wall 8 of the spool chamber 7 can have a concave part 8b, not in a form of an opening penetrating itself, only on its outer side thereof in which the part of the corner of the electronic component 15, 16 is positioned, as shown in FIG. 3 as the third embodiment of the present invention.

Figure 4:
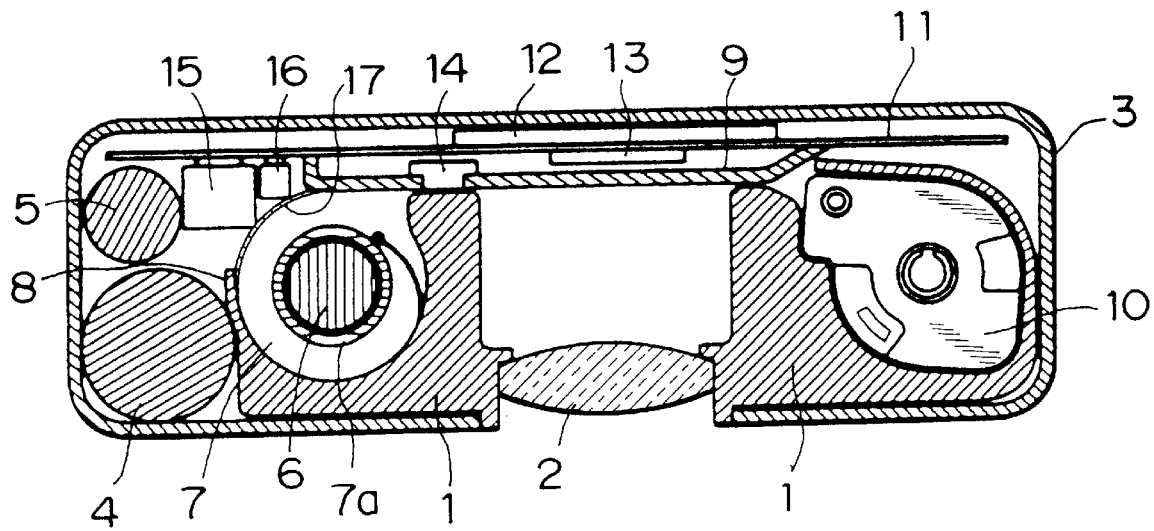
FIG. 4 is a transverse cross-sectional view of a camera according to a fourth embodiment of the present invention.

Different from the first through third embodiments, a part of the outer wall 8 of the spool chamber 7 can be formed as a thin, film-like member or sheet 17, as shown in FIG. 4 as the fourth embodiment of the present invention. Also as shown in FIG. 4, sheet 17 has a substantially uniform thickness.

According to the structure of the embodiment, the outer wall corresponding to the sheet 17 of the spool chamber is substantially reduced in width; therefore, it is possible to secure a larger space by the width for the electronic components 15 and 16 mounted on the printed board 11. In other words, with the structure of the embodiment, a thin, compact-sized camera is more easily designed.

Furthermore, according to the structure of the fourth embodiment, the leader of the film is smoothly guided by the sheet 17 at time of forwarding the film leader from the film cartridge 10 towards the spool 7a of the spool chamber 7.

In addition, according to the structure of the fourth embodiment, the electronic components 15 and 16 are completely parted off from the inside of the spool chamber 7 by the sheet 17, a formation or an occurrence of a scar or a scratch on the film surface is surely prevented.

In the structure of the fourth embodiment, it is preferable that the sheet 17 is formed opaque to shield or shade a light completely. With the structure, it is possible to prevent the light from entering the spool chamber 7.

Although the present invention has been fully described in connection with the preferred embodiments thereof with reference to the accompanying drawings, it is to be noted that various changes and modifications are apparent to those skilled in the art.

For example, although not shown in the figures, a part of the outer wall 8 of the spool chamber 7 may have such a concave part as accommodating a partial periphery of the battery 4.

With the structure, it is possible to reduce the size of the cover 3 in a direction in which the film is fed between the spool 7a and the film cartridge 10.

Such changes and modifications are to be understood as included within the scope of the present invention as defined by the appended claims unless they depart therefrom.

What is claimed is:

1. A camera comprising:

a spool for winding a film thereon;

a spool chamber in which said spool is disposed, wherein the spool chamber is defined with an inner surface of an outer wall;

said spool chamber having an opening penetrating through the outer wall, said opening being defined by at least one edge of said outer wall; and a component positioned outside of said spool chamber, at least a portion of said component protruding into said opening so as to be adjacent the edge of said opening, thereby providing a compact arrangement of camera parts outside of said spool chamber;

wherein the opening is covered with a sheet-like member from inside of the spool chamber.

2. The camera as claimed in claim 1, wherein the sheet-like member is formed by a light-shielding member.

3. The camera as claimed in claim 1, wherein the component is an electrical component.

4. A camera comprising:

a printed board which is provided between a rear cover of a camera body, and a pressure plate by which a film is biased against a member having an exposure window, wherein the printed board extends in a field larger than a field in which the pressure plate extends;

at least one electric component which is mounted on the printed board; and a spool chamber in which a spool for winding a film is provided, wherein the spool chamber is defined with an outer wall with an opening penetrating the outer wall in which at least a part of the electric component is positioned.

5. The camera as claimed in claim 4, wherein the opening is covered with a sheet-like member from inside of the spool chamber.

6. A camera comprising:

a spool for winding a film thereon;

a spool chamber in which said spool is disposed, wherein the spool chamber is defined with an inner surface of an outer wall;

said spool chamber having a plurality of openings penetrating through the outer wall, said openings being defined by at least one edge of said outer wall; and a plurality of components positioned outside of said spool chamber, at least a portion of each of said components protruding into one of said openings so as to be adjacent the edge of said one of said opening, thereby providing a compact arrangement of camera parts outside of said spool chamber;

wherein each of said openings accommodates a portion of a different component located outside said outer wall.

7. A camera comprising:

a spool chamber in which a spool for winding a film thereon is disposed, wherein the spool chamber is defined with an outer wall, and wherein the spool chamber has an opening penetrating through the outer wall, said opening being defined by at least one edge of said outer wall;

a motor which is disposed inside the spool;

a battery disposed at a location that is adjacent the spool chamber and which is on a same side of a camera body relative to the spool chamber; and a component, except the motor and the battery, at least a part of which protrudes into the opening of the outer wall so as to be adjacent the edge of said opening, thereby providing a compact arrangement of camera parts outside of said spool chamber.

8. The camera as claimed in claim 7, wherein the part of the component that protrudes into the opening of the outer wall extends generally in a direction from a rear side of the camera to a front side thereof.

* * * * *